United States Patent
Asselin et al.

(10) Patent No.: US 9,543,781 B2
(45) Date of Patent: Jan. 10, 2017

(54) APPARATUS FOR INDUCTIVELY TRANSMITTING ELECTRICAL ENERGY

(75) Inventors: Pascal Asselin, Riedisheim (FR); Andrew Green, Malsburg-Marzell (DE); Mathias Wechlin, Kandern (DE)

(73) Assignee: CONDUCTIX-WAMPFLER GMBH, Weil am Rhein-Markt (DE)

( * ) Notice: Subject to any disclaimer, the term of this patent is extended or adjusted under 35 U.S.C. 154(b) by 502 days.

(21) Appl. No.: 14/351,927

(22) PCT Filed: Aug. 23, 2012

(86) PCT No.: PCT/EP2012/066438
§ 371 (c)(1),
(2), (4) Date: Jul. 15, 2014

(87) PCT Pub. No.: WO2013/056879
PCT Pub. Date: Apr. 25, 2013

(65) Prior Publication Data
US 2014/0327394 A1     Nov. 6, 2014

(30) Foreign Application Priority Data

Oct. 17, 2011 (DE) .......................... 10 2011 054 541

(51) Int. Cl.
*H02J 7/02* (2016.01)
*H01F 3/10* (2006.01)
*H01F 38/14* (2006.01)

(52) U.S. Cl.
CPC ................. *H02J 7/025* (2013.01); *H01F 3/10* (2013.01); *H01F 38/14* (2013.01); *H01F 2003/106* (2013.01)

(58) Field of Classification Search
CPC ............. H02J 7/025; H01F 3/10; H01F 38/14; H01F 2003/106
See application file for complete search history.

(56) References Cited

U.S. PATENT DOCUMENTS

| 4,800,328 A | 1/1989 | Bolger et al. |
| 8,193,886 B2 | 6/2012 | Hahn |

(Continued)

FOREIGN PATENT DOCUMENTS

| DE | 102006048829 | 4/2008 |
| DE | 10 2010 050935 | 9/2011 |
| WO | 2010/090538 | 2/2010 |

OTHER PUBLICATIONS

English Translation of International Preliminary Report on Patentability dated Apr. 22, 2014 for PCT/EP2012/066438.

(Continued)

*Primary Examiner* — Jared Fureman
*Assistant Examiner* — Rafael Pacheco
(74) *Attorney, Agent, or Firm* — Paul D. Bianco; Gary S. Winer; Fleit Gibbons Gutman Bongini & Bianco PL

(57) ABSTRACT

An apparatus for inductively transmitting electrical energy from a stationary unit to a mobile unit which is located adjacent to the stationary unit. The apparatus has a coil and a flux guide unit for guiding a magnetic flux occurring during operation of the apparatus with at least one ferromagnetic body, which consists of a multiplicity of individual elements. The flux guide unit has the basic shape of a plate and is arranged on one side of the coil perpendicular to the winding axis thereof in such a way that it covers the cross-sectional area of the coil at least partially. The ferromagnetic body includes individual elements with anisotropic magnetic permeability and has, overall, anisotropic magnetic permeability. In a viewing plane perpendicular to the winding axis of the coil, the individual elements of the ferromagnetic body are aligned with respect to the coil in those regions in which a ferromagnetic body with anisotropic permeability covers winding sections of the coil, in such a way that the preferred direction of magnetic permeability, in which the magnetic permeability has its greatest magni- (Continued)

tude in the viewing plane, is at least approximately perpendicular to the winding sections of the coil.

15 Claims, 4 Drawing Sheets

(56) References Cited

U.S. PATENT DOCUMENTS

| | | |
|---|---|---|
| 2010/0007215 A1 | 1/2010 | Sakuma |
| 2010/0072815 A1 | 3/2010 | Hahn et al. |
| 2010/0219183 A1* | 9/2010 | Azancot .................. H02J 5/005 219/676 |
| 2012/0007442 A1* | 1/2012 | Rhodes .................. H01F 38/14 307/104 |
| 2012/0025603 A1 | 2/2012 | Boys |

OTHER PUBLICATIONS

International Search Report for PCT/EP2012/066438 dated Dec. 13, 2012.
Written Opinion for PCT/EP2012/066438, filed Aug. 23, 2012.
Written Opinion (English translation) for PCT/EP2012/066438 available Apr. 17, 2014.

* cited by examiner

APPARATUS FOR INDUCTIVELY TRANSMITTING ELECTRICAL ENERGY

FIELD OF THE INVENTION

The invention concerns an apparatus for inductively transmitting electrical energy. Such apparatuses are especially used for inductively charging a rechargeable battery incorporated into an electric vehicle. To attain a high degree of efficiency, the magnetic coupling between the primary and secondary coils must be optimized, wherein an air gap between the two sides is unavoidable. Therefore, a guidance of the magnetic flux by bodies made of ferromagnetic material is advantageous, so as to minimize as much as possible losses due to a dispersion of the magnetic field.

BACKGROUND OF THE INVENTION

From U.S. Pat. No. 4,800,328, a battery charging apparatus for an electric vehicle is known, in which the primary coil and the secondary coil are wound around a core made of ferromagnetic material, which with transformers is usually composed of a multiplicity of individual plates. This construction has a large weight and a great overall height, both of which are disadvantageous and, in particular, for the vehicle, extremely undesirable according to modern-day standards.

From DE 10 2006 048 829 A1, a system for inductively transmitting electrical energy to a magnetic levitation vehicle along its route is known, whose secondary coil is equipped with a grid-shaped unit for the guidance of the magnetic flux. This flux guide unit is produced from plastic by the pouring of a mixture of casting resin and ferrite powder into a casting mold. In the finished state of the flux guide unit, the casting mold functions as its basic body.

From WO 2010/090538 A1, a coil of a system for inductively transmitting electrical energy is known, which is wound around a flat ferrite core. This ferrite core significantly extends in the longitudinal direction beyond the ends of the coil and has two pole surfaces there, on which the magnetic flux is supposed to leave the core, perpendicular to the longitudinal direction of the coil, in order to extend from there into an area in which its second coil is found in the operation of the inductive transmission system.

SUMMARY OF THE INVENTION

An embodiment of the invention relates to a novel solution for magnetic flux guidance in an apparatus for inductively transmitting energy, which is characterized by a low overall height and a small weight as well as by robustness in processing and in operation.

For guiding a magnetic flux in an apparatus for inductively transmitting energy, the invention provides for a unit with the basic form of a plate, which is located on a side of the coil, perpendicular to its winding axis, in such a way that it covers at least in part the cross-sectional area of the coil, and which has at least one ferromagnetic body, which is composed of a multiplicity of individual elements with anisotropic magnetic permeability and which has as a result an anisotropic magnetic permeability. In a viewing plane perpendicular to the winding axis of the coil, the individual elements of the ferromagnetic body with anisotropic permeability are aligned relative to the coil in such a way that the preferred direction of magnetic permeability in which this has the greatest amount in the viewing plane is at least approximately perpendicular to the windings of the coil.

Thus, instead of the brittle and high-grade, fracture-susceptible ferrite, it is possible to use, at least in part, a nanocrystalline, soft-magnetic material with better mechanical characteristics with a comparable permeability and a comparable, or even somewhat lower, weight for the guiding of the flux, without the anisotropy of the permeability, which is a characteristic of this material, impairing the effectiveness of the guiding of the flux and thus, the efficiency of the entire inductive transmission of energy. As a result of the better mechanical stability of the nanocrystalline, soft-magnetic material, it is possible to use plate-shaped bodies of a lower thickness than would be possible with ferrite, so as to construct a flux guide unit that is as a whole essentially plate-shaped. Thus, both the overall height as well as the weight of the entire flux guide unit can be reduced.

As a result of the anisotropy of its magnetic permeability, this material, however, is not suitable for very inhomogeneous field areas in which the field direction clearly changes within small distances, since in such areas, either the maximum permeability of the material could not be used, and thus, effective field guidance would not exist there, or the material would have to be aligned there in small pieces like a mosaic according to the pattern of the field, which would involve a manufacturing technology expense that is not justifiable. In such areas, therefore, with the acceptance of poorer mechanical characteristics, material with isotropic permeability, preferably soft-magnetic ferrite, is used, if the existing requirements for the effectiveness of the flux guidance make it necessary. Given the fact that in this case, fewer and smaller ferrite plates are needed than with the sole use of ferrite, it is possible, nevertheless, to reduce the overall height and the weight of the flux guide unit as a whole.

An expedient manufacturing of the bodies from anisotropic ferromagnetic material exists in the adaptation to the material characteristics of soft-magnetic, nanocrystalline material available on the market, which can be obtained only in bands of relatively small thickness, in a lamination of individual, strip-shaped elements to form packets with nonconducting adhesive between the elements. The strip shape of the individual elements and the insulating effect of the nonconducting adhesive layer, which is found between two adjacent elements, has an additional advantageous effect with the permeability-caused alignment relative to the windings of the coil, namely, in that the formation of eddy currents is largely avoided and this improves the efficiency of the inductive energy transmission.

Furthermore, in this way, both bodies with a uniform preferred direction of the permeability and also those with a purposefully varying preferred direction are implemented. The latter can be attained in a simple manner by a fan-shaped arrangement of the individual elements, in which the thickness of the insulating adhesive layers changes in the longitudinal direction of the strips.

An advantageous geometric design is to be found in that the windings of the coil are arranged in a planar manner on the flux guide unit and run in the shape of a spiral. The result is a flat construction form of the entire arrangement with an effective flux guidance in a lateral direction through the ferromagnetic flux guide unit, which, in this case, can have the simple form of a plate.

For the placing of ferromagnetic bodies with an anisotropic permeability, especially suitable are those sections of the coil winding in which the windings run in a straight line and parallel to one another, wherein the preferred direction of the permeability in this case is perpendicular to the windings. With a rectangular form of the coil, one can also take into consideration, moreover, the diagonals for the arrangement of such ferromagnetic bodies.

If the coil consists of two similar windings connected serially to one another with winding axes parallel to one another and an opposed winding direction, which are arranged in a viewing plane perpendicular to the winding axes adjacent to one another, and at least in those two areas in which they are facing one another, both windings have straight-line winding sections parallel to one another, then for the flux guidance, a single ferromagnetic body with anisotropic permeability, which covers these winding sections of both windings and at least one part of the areas of their individual cross-sectional areas surrounded by the windings, is sufficient. The structure of the flux guide unit is greatly simplified in this way.

In order to further improve the flux guidance with this coil shape, two bodies with an isotropic permeability, of which each covers additional parts of the cross-sectional areas of the two windings, can be arranged staggered on both sides and adjacent to the ferromagnetic body with an anisotropic permeability and opposite it, perpendicular to the connecting line of the two winding axes. In this case, the structure of the flux guide unit is still very simple and has only a minimal number of ferromagnetic bodies, which greatly simplifies the assembly.

The coil can be either a primary coil connected to a power supply or a secondary coil connected to a charging electronic unit of an energy storage device of a mobile unit, such as, in particular, a battery of an electrically driven vehicle, that is, the invention can be equally used on both sides of an inductive energy transmission system.

BRIEF DESCRIPTION OF THE DRAWINGS

Embodiment examples of the invention are described below with the aid of the drawings. The figures in these drawings show.

DETAILED DESCRIPTION OF THE INVENTION

Figure 1:
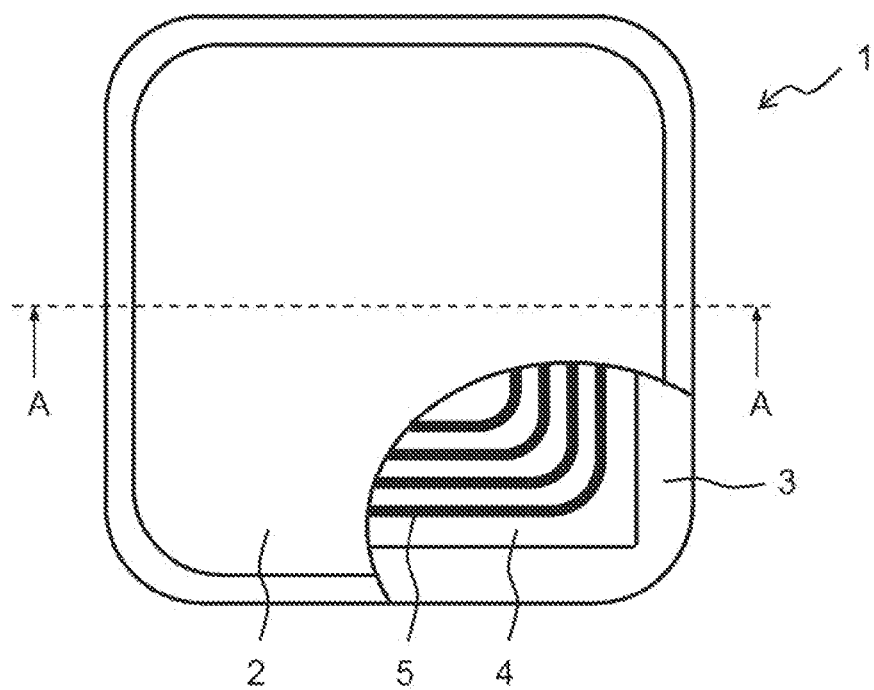
FIG. 1, a schematic representation of an embodiment of a primary coil unit in accordance with the invention in a top view with a partially cut-out housing.

FIG. 1 shows an apparatus in accordance with the invention for inductively charging an electric vehicle, as an example, a primary coil unit 1 in a top view with a partially, that is, in the right lower quadrant, cut-out housing cover 2. The housing also comprises in addition to the cover 2 a base plate 3, which together form a cavity in which a ferromagnetic flux guide unit 4, which as a whole is shaped like a plate, is situated on the base plate 3 and on the unit, a planar primary coil 5. The housing cover 2 consists of a material that is permeable for a magnetic field, such as plastic. The primary coil unit 1 is situated on or in the bottom of a storage space for an electric vehicle.

For the charging of the battery of an electric vehicle, which is equipped on its underside with a similar secondary coil unit, the vehicle is placed in such a way that the secondary coil unit coincides as much as possible over the primary coil unit, so as to make possible an efficient inductive energy transmission between the two units. On the secondary coil element, a corresponding ferromagnetic flux guide unit is situated, which is turned away from the primary coil unit 1, so that the two coil units lie as mirror images to one another during operation with respect to the sequence of the previously mentioned components, wherein, however, they need not be the same size.

Figure 2:
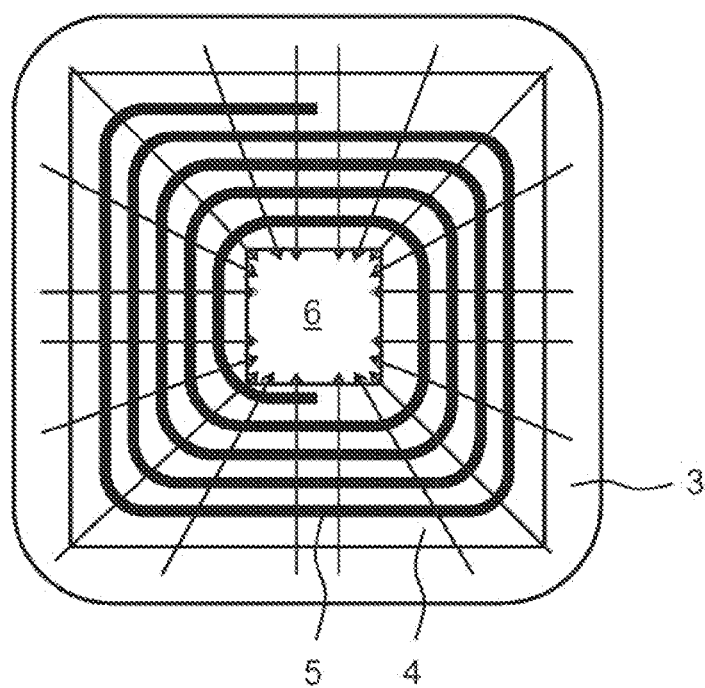
FIG. 2, the primary coil unit of FIG. 1 in a top view without a housing cover.

FIG. 2 shows the same view as FIG. 1, but without the housing cover 2. As can be seen there, the base plate 3, which, for example, can be made of aluminum, in order to carry out the function of a shielding of the magnetic field, has an essentially square shape with rounded-off corners. The plate-shaped, ferromagnetic flux guide unit 4, whose task is the guidance in a lateral direction of the magnetic flux produced in operation by the primary coil 5, has a square outer contour, a likewise square inner section 6 and thus, as a whole, the shape of a square frame. The outer side length of the ferromagnetic flux guide unit 4 is smaller here than that of the base plate 3, so that the ferromagnetic flux guide unit 4 is as a whole on the base plate 3. It can be connected to it by cementing. In addition, a layer of electrically insulating material can be found between the flux guide unit 4 and the base plate 3. How the base plate 3 has to be dimensioned, in proportion to the flux guide unit 4 in the individual application case, and whether a base plate 3 is needed at all, depends on the pertinent surroundings (installation site, shielding requirement, assembly possibilities).

The planar primary coil 5 lying on the ferromagnetic flux guide unit 4 has, like the ferromagnetic flux guide unit 4, essentially the shape of a square frame. It is guided in the shape of a spiral, wherein straight-line sections, which run parallel to the four sides of the square ferromagnetic flux guide unit 4, are connected to one another in the corners by arms. From the ends of the primary coil 5, nondepicted lines lead to a likewise nondepicted power supply, which supplies the primary current during operation.

A current supply of the primary coil 5 produces a magnetic field, whose pattern in the plane of the ferromagnetic flux guide unit 4 is shown by the arrows that are intended to depict field lines, drawn in FIG. 2 and pointing to the center. The plate-shaped, ferromagnetic flux guide unit 4 leads the magnetic flux below the primary coil 5 in the horizontal direction, and thus hinders the spreading of a magnetic dissemination field below the primary coil 5 perpendicular to the viewing plane of FIG. 2. It is to be understood that the ferromagnetic flux guide unit 4 is made of a soft-magnetic material, so as to avoid hysteresis losses during the transmitting of energy.

As FIG. 2 shows, with the square shape of the primary coil 5 assumed in the example shown, the magnetic field in the ferromagnetic flux guide unit 4 below the primary coil 5, more precisely, the component of the field lying parallel to the plate plane of the flux guide unit 4, in those areas in which adjacent windings of the conductor forming the primary coil 5 run in a straight line and parallel to one another, is approximately homogeneous, whereas in those areas in which this is not the case, that is, toward the corners of the square frame covered by it, it is increasingly inhomogeneous. Analogously, this would also be valid with a rectangular shape of the primary coil 5 with two longer and two shorter sides, whereas the field below the primary coil 5 with a round shape of the primary coil 5 would be inhomogeneous everywhere. To the extent that the discussion is about field directions here, these always refer to the viewing direction of FIG. 2, that is, to the component lying in the viewing plane of FIG. 2.

Figure 3:
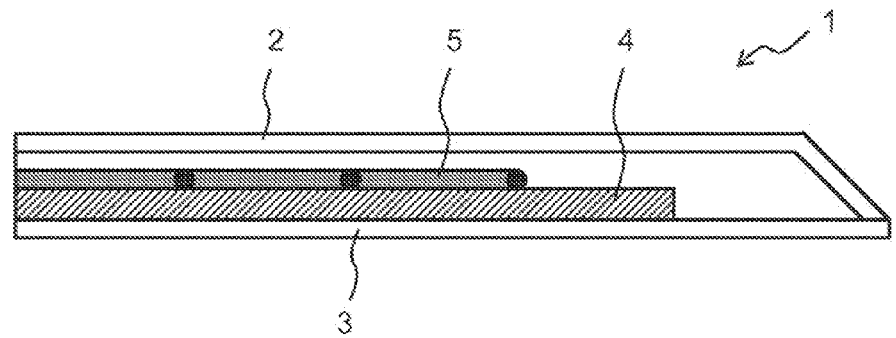
FIG. 3, a part of a longitudinal sectional view of the primary coil unit of FIG. 1 along line A-A line in FIG. 1.

FIG. 3 shows a cutout of a longitudinal section of the primary coil unit 1 along line A-A in FIG. 1, in the area of the right edge. The vertical layering of the components, namely from below, upwards, relative to the base plate 3, the ferromagnetic flux guide unit 4, the primary coil 5, and the cover 2, can be clearly seen in it. The black circles within the primary coil 5 characterize windings that are cut perpendicularly from the viewing plane of FIG. 3. The cover 2 is inclined toward the outside on its edge.

Figure 4:
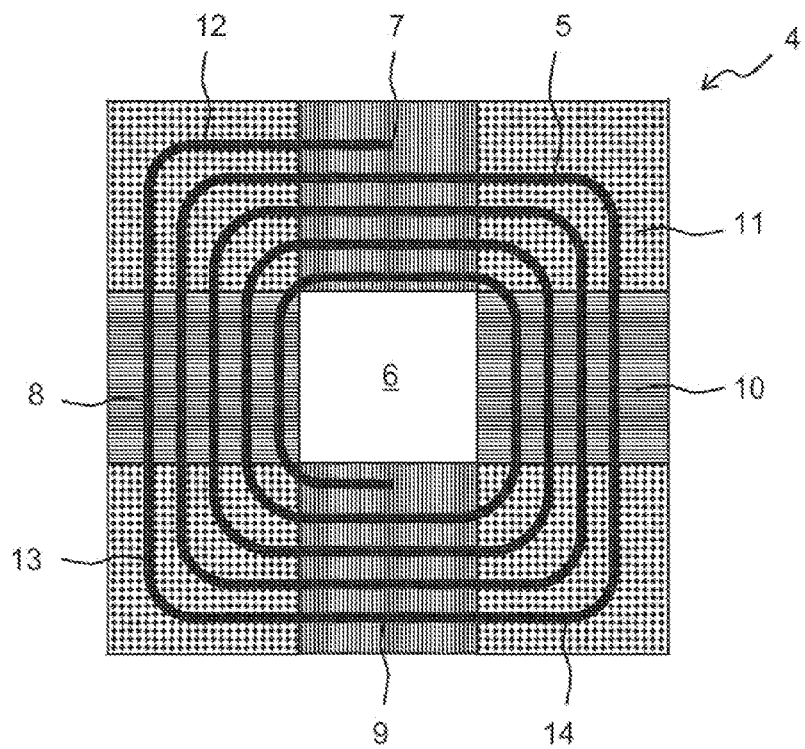
FIG. 4, a first embodiment of a flux guide unit in accordance with the invention.

A first embodiment example of the structure of the ferromagnetic flux guide unit 4 is shown schematically in FIG. 4 in a top view. The flux guide unit 4 consists of two different types of ferromagnetic bodies, which are made of different materials. Four square bodies 7 to 10 made of a first material touch each other in pairs, cyclically, on a corner and together form a surface in the shape of a solid cross with a recessed square center 6. Four bodies 11 to 14, which are likewise square and are made of a second material, cover the surfaces between the solid cross formed by the bodies 7 to 10 and the corners of the square, which circumscribes this solid cross. Together, the bodies 7 to 10 and 11 to 14 form a frame with a square outer circumference and a square inner circumference, in which square bodies made of different materials cyclically alternate.

As a comparison of FIGS. 2 and 4 shows, the bodies 7 to 10 made of the first material cover areas with an approximately homogeneous field pattern, in which all windings of the primary coil 5 run in at least approximately a straight line and parallel to one another. In contrast to this, the bodies 11 to 14, made of the second material, are found in areas with an inhomogeneous field pattern. Curvatures of the windings of the primary coil 5 are found there, or at least not all windings there run parallel to one another over the entire area. Since the homogeneous and inhomogeneous areas of the field, however, are continuously converted into one another, the bodies 7 to 10 made of the first material extend partially also into spatial areas with a somewhat inhomogeneous field pattern.

As is indicated in FIG. 4, the first material of the ferromagnetic body 4 for the bodies 7 to 10 consists of a large number of individual strips, which are situated parallel to one another and are joined with one another by cementing, that is, they are laminated to form a packet. This material is a nanocrystalline, soft-magnetic material on the basis of iron, silicon, and boron, with additives like, in particular, niobium and copper. At present, for example, such a material can be obtained on the market under the designation Vitroperm®, in a composition of 73.5% Fe, 1% Cu, 3% Nb, 15.5% Si, and 7% B. Other designations under which such materials are known are Finemet®, Nanoperm®, and Hitperm. The latter can, for example, have a composition of, together, 88% Fe and Co, 7% Nb, Zr, or Hf, 4% B and 1% Cu.

This type of material has an anisotropic permeability and in comparison to soft-magnetic ferrite with comparable magnetic characteristics, is less brittle and therefore, in case of mechanical stress in processing and when in operation, is less susceptible to fractures. This is true particularly for plate-shaped bodies with a small thickness, as they are needed for reasons having to do with a savings in installation space and weight for the use of interest here. Furthermore, this material is slightly lighter than ferrite.

In the arrangement in accordance with the invention, the preferred direction of the magnetic permeability of the first material, that is, the direction of greatest permeability, is the longitudinal direction of the strips. This runs perpendicular to the outer circumference of the frame-shaped ferromagnetic flux guide unit 4 and thus, also perpendicular to the windings of the coil 5. In the area of the bodies 7 to 10 of the ferromagnetic flux guide unit 4, which are made of the first material, therefore, the magnetic field direction essentially coincides with the preferred direction of the permeability, wherein the maximum permeability of the first material can be used.

In the area of the corners of the frame-shaped, ferromagnetic flux guide unit 4, there is a clear inhomogeneity of the magnetic field. There, that is, in the gaps between the bodies 7 to 10 made of the first material, bodies 11 to 14 made of the second material, which has an isotropic, magnetic permeability, are situated so that the effectiveness of the flux guidance is not impaired by the inhomogeneity of the magnetic field. The magnetic field is also inhomogeneous in the area of the square center 6. This need not, therefore, be absolutely recessed, but rather a plate made of the second material could likewise be situated there. For example, this second material can be ferrite.

Although it would be desirable for the ferromagnetic flux guide unit 4 as a whole to be able to use a nanocrystalline, soft-magnetic material of the previously mentioned type, which is less brittle than ferrite, nevertheless this material would not be suitable for areas with a greatly inhomogeneous field pattern because of the anisotropy of its permeability, or because the production of a body with a preferred direction of the permeability precisely adapted to an inhomogeneous field pattern would be too expensive. The hybrid solution made of two different materials, shown in FIG. 4, reaches a balanced compromise between manufacturing technology expense and magnetic effectiveness. With the two materials, the individual bodies 7 to 14 of the ferromagnetic flux guide unit 4 have simple rectangular shapes, which can be produced from larger pieces without any problem by sawing. Also, the joining of the bodies 7 to 14 does not cause any difficulties because of the simple shape of the individual bodies 7 to 14.

Depending on the requirements of the effectiveness of the inductive energy transmission, on the one hand, and of the weight and the costs of the entire apparatus, on the other hand, it may also be sensible to omit the bodies 11 to 14 made of the second material in the corners of the frame and to leave the gaps there empty between the bodies 7 to 10 made of the first material. This results in a greater dissemination of the magnetic flux in the area of the corners, but in return, material, weight, and labor are saved and the use of brittle ferrite is avoided. The advantages and disadvantages of the two embodiments with and without ferrite plates in the corners have to be weighed in the individual application case.

Figure 5:
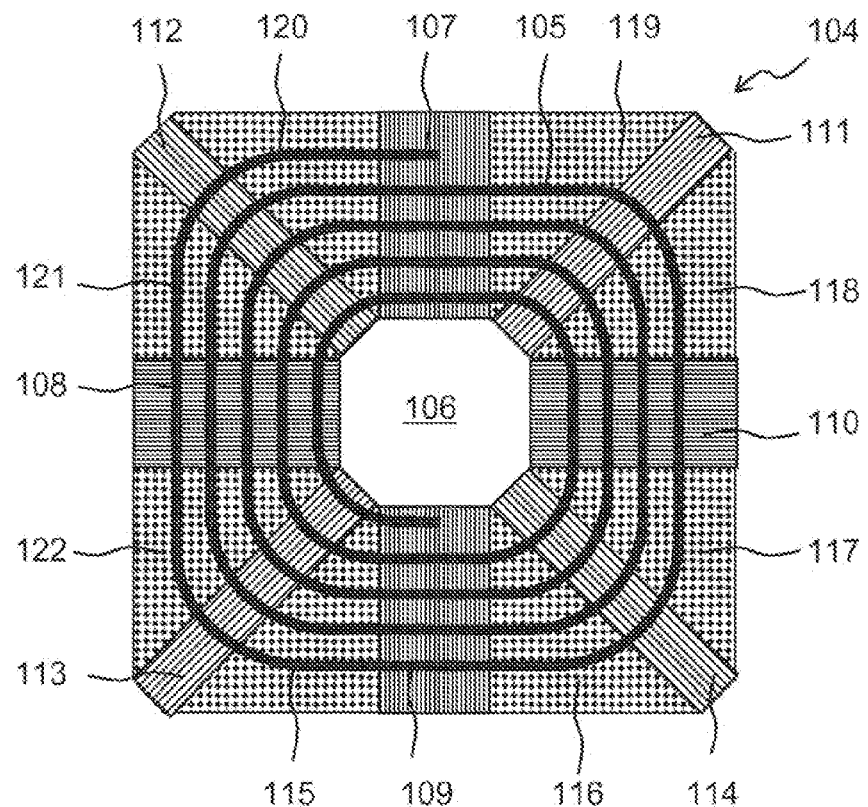
FIG. 5, a second embodiment of a flux guide unit in accordance with the invention.

A second embodiment example for a possible structure of a ferromagnetic flux guide unit 104 is shown schematically in FIG. 5 in a top view. Here, four plate-shaped, ferromagnetic bodies 107 to 110, which are rectangular in the view from FIG. 5 and are made of a first material, are arranged in the shape of a cross as in the first embodiment, around a recessed center 106, and in this way, approximately define a square frame.

In contrast to the first embodiment, the plate-shaped bodies 107 to 110, however, are narrower and do not touch each other on the inner circumference of the frame, wherein there is room for four additional plate-shaped, ferromagnetic bodies 111 to 114 made of the same material, which are arranged diagonally between the inner and the outer corners of the square frame and thus, also lie in the shape of a cross around the recessed center. The corners of the diagonal bodies 111 to 114 touch the corners of the bodies 107 to 110 on the inside of the frame, so that the recessed center receives an octagonal shape. The rectangular shape of the diagonal bodies 111 to 114 also produces an octagonal shape of the outer circumference of the frame-shaped flux guide unit 104.

As a comparison of FIGS. 2 and 5 shows, the ferromagnetic bodies 107 to 110 made of the first material also cover areas with an approximately homogeneous field pattern here, in which all windings of the primary coil 105 run in a straight line and parallel to one another, and this is done in such a way that the preferred direction of the magnetic permeability is perpendicular to the windings of the coil 105. This is approximately true also for the diagonal ferromagnetic bodies 111 to 114, although they are in the curvature areas of the coil 105 since the bodies 111 to 114 are so narrow that they do not extend laterally beyond the curvature areas of the coil 5 and their curvature radii are so large that the windings lie beyond the width of the bodies 111 to 114 approximately perpendicular to the diagonal direction, which is the preferred direction of the permeability here. At least beyond the width of the bodies 111 to 114, there is no significant deviation from such a position.

Alternative to the square or rectangular shape with rounded-off corners with a large curvature radius shown in FIG. 5, the coil 105 could also have an octagonal shape with four long and four short sides in alternating sequence, wherein the short sides of the octagon would replace the rounded-off corners of the shape of FIG. 5. In this case, the windings in those sections in which they are covered by the diagonal bodies 111 to 114 would lie not only approximately, but rather precisely perpendicular to the preferred direction of the permeability.

As is indicated in FIG. 5, the first ferromagnetic material of the flux guide unit 104 used for the bodies 107 to 110 and also 111 to 114 also consists here of a multiplicity of individual strips that are arranged parallel to one another and are joined with one another by cementing, that is, they are laminated to form a packet. The preferred direction of the magnetic permeability of the first material, that is, the direction of greatest permeability, is also the longitudinal direction of the strips here, which lies perpendicular to the inner and outer circumference of the frame, which is octagonal in this case and is defined by the ferromagnetic flux guide unit 104. The first ferromagnetic material is the same as in the previously described first embodiment.

The nonconducting bonding layer, which holds the individual strips made of the first ferromagnetic material together, simultaneously electrically insulates the individual strips from one another. With the previously described orientation of the strips perpendicular to the windings of the coil 5 or 105, the effect of this is that the eddy current losses in the material are minimized and the effectiveness of an inductive energy transmission apparatus whose primary and secondary coils are equipped with a flux guide unit 4 or 104 is improved.

The gaps existing between the ferromagnetic bodies 107 to 114 have in this case the shape of rectangular triangles. In these gaps, the magnetic field pattern is clearly inhomogeneous. Analogous to the first embodiment, these gaps are filled with plate-shaped bodies 115 to 122 made of a second ferromagnetic material with isotropic magnetic permeability. This second ferromagnetic material is the same as in the previously described first embodiment. The triangular bodies 115 to 122 all have the same dimensions and can in a simple manner be produced from a square plate by a diagonal cut. The different plate-shaped bodies 107 to 110, 111 to 114 and 115 to 122 can here also be readily joined to form the flux guide unit 104. Alternatively, the gaps can also be left free as in the first embodiment.

Figure 6:
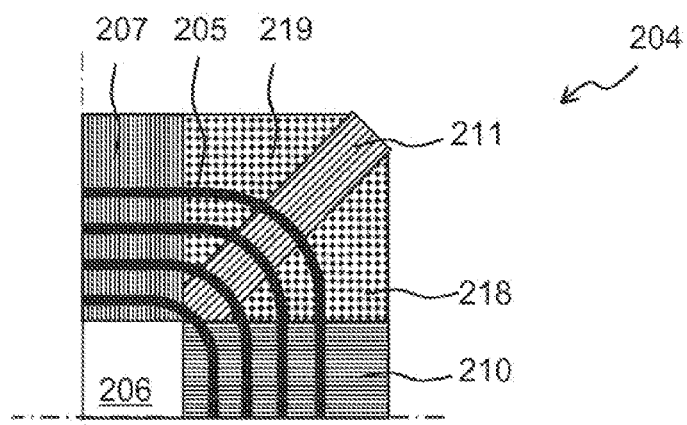
FIG. 6, a part of a third embodiment of an arrangement in accordance with the invention, a flux guide unit.

The first and second embodiments can also be advantageously combined with one another, which leads to a third embodiment of which only the right upper quadrant of a flux guide unit 204 is shown in FIG. 6 since the other quadrants are mirror-symmetrical relative to it. Rectangular, anisotropic ferromagnetic bodies 207 and 210 with the same preferred direction of permeability as in the first embodiment are used here, which, however, touch each other on the corners, from which again a square but smaller recess 206 is produced in the center of the frame. The diagonal, anisotropic ferromagnetic body 211 has in this case a tip with a right angle, so that it can be completely inserted into the corner of the gap between the bodies 207 and 210.

The isotropic ferromagnetic bodies 218 and 219, which are visible in FIG. 6, and the coil 205, of which only a part is visible in FIG. 6, are the same as in the second embodiment of FIG. 5. The advantage of the third embodiment according to FIG. 6 in comparison to the first and second embodiments is to be found in that, as a whole, a larger fraction of the flux guide unit 204 is formed by ferromagnetic bodies made of the first material with anisotropic magnetic permeability. In return, the shaping of the body 211 with the rectangular tip is somewhat more complicated and requires a somewhat more time-consuming processing of the raw material.

Figure 7:
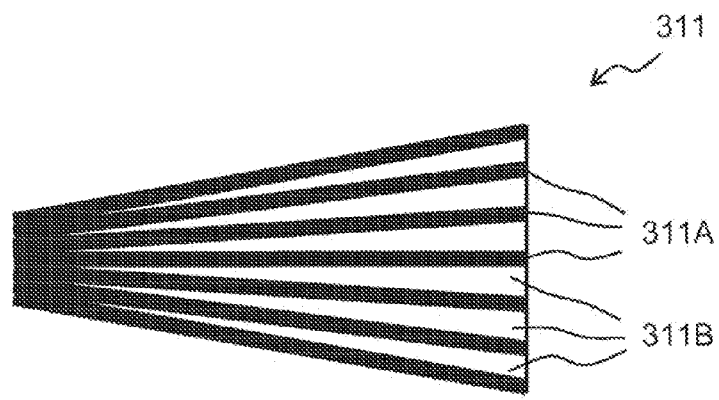
FIG. 7, an embodiment of a ferromagnetic body with an anisotropic permeability for the flux guidance in inhomogeneous field areas.

In order to also be able to use the first material with anisotropic magnetic permeability in spatial areas with a clear inhomogeneity of the magnetic field strength in an efficient manner for the flux guidance, the preferred direction of the magnetic permeability must vary within a body made of such a material. FIG. 7 shows one possibility of attainment of this. The ferromagnetic body 311 shown there has as a whole a trapezoidal form and has a multiplicity of individual strips 311A made of the first material with an anisotropic magnetic permeability, which are joined with one another with adhesive-containing bonding layers 311B. Whereas the strips 311A have a constant width, the thickness of the bonding layers 311B varies continuously along the strips 311A. With a linear rise in this thickness between the ends of the strips 311A, the trapezoidal shape of the body 311 shown in FIG. 7 is produced, within which the individual strips 311A are arranged in the shape of a fan. Here also, the preferred direction of the magnetic permeability is again the longitudinal direction of the strips 311A.

A ferromagnetic body 311 of the type shown in FIG. 7 could, for example, replace the bodies 111 to 114 in the second embodiment in accordance with FIG. 5, so as to more accurately comply with the requirement of a pattern of the windings of the coil 5 perpendicular to one another, and of the preferred direction of the magnetic permeability in the area of the diagonals. The ferromagnetic body 311 can also be produced with a rectangular tip in order to replace, with the same goal, the body 211 found in the third embodiment example. It could, however, also be used in those areas in which only ferromagnetic bodies with an isotropic permeability are used in the three previously described embodiment examples, because of the strong inhomogeneity of the magnetic field. Also for use in the centers 6, 106, or 206 of the coils 5, 105, or 205, the trapezoidal body 311 can be taken into consideration, wherein to cover a greater angular area, several such bodies 311 can also be arranged laterally next to one another.

The production of a trapezoidal ferromagnetic body 311 with an anisotropic permeability of a direction that varies in the shape of a fan in accordance with FIG. 7 can take place in that upon cementing strips 311A of the first ferromagnetic material together, after the application of the adhesive-containing bonding layers 311B and the joining of the strips 311A onto the strip packet thus formed, in which the thickness of the bonding layers 311B is initially and approximately the same everywhere, a pressure that varies in the longitudinal direction of the strips 311A is exerted with a mold, by means of which the bonding layers 311B are partially pressed out on one end of the strip packet. This presupposes that the bonding layers have not yet hardened and have a flow capacity that is sufficient for this type of processing but is also not yet excessively high.

The basic structure of the ferromagnetic body 311, consisting of individual strips 311A of constant thickness of the first ferromagnetic material and the adhesive-containing, bonding layers 311B that lie in between, is also valid for the bodies made of this material used in the other embodiment examples, but in these also, the bonding layers have a constant thickness, so that the strips lie parallel to one another. The thickness of the bonding layer is maintained as low as possible there, so as to fill as large as possible a fraction of the frame with ferromagnetic material.

Figure 8:
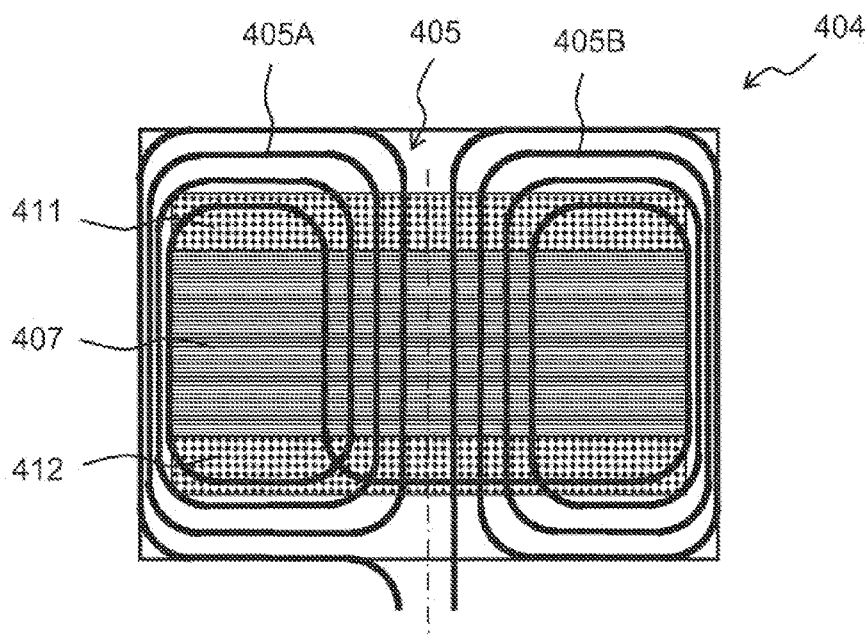
FIG. 8, a fourth embodiment of a flux guide unit in accordance with the invention.

A fourth embodiment example for a possible structure of a ferromagnetic flux guide unit 404 is shown schematically in FIG. 8 in a top view. Here, the coil 405 consists of two windings 405A and 405B connected to one another in series with winding axes parallel to one another. As in the other embodiments, they are planar windings. Only the line that connects the windings 405A and 405B necessarily crosses over their windings. The two windings 405A and 405B run in opposite directions to one another, so that the main direction of the magnetic field formed when the coil 405 is supplied with energy, in the interior of one of the two windings 405A or 405B, points out of the viewing plane of FIG. 8, lying perpendicular to the winding axes of the two windings 405A and 405B, and in the interior of the other winding 405B or 405A, points into the viewing plane, whereas in the previously described embodiment in the interior of the coils 5, 105, or 205, there is only one single main direction of the magnetic field, which, depending on the direction of the current from the viewing plane of FIGS. 4 to 6, points out of or into this plane.

The two windings 405A and 405B have a rectangular cross-sectional shape and are conducted in a mirror-image symmetrical manner relative to a symmetry line S in the viewing plane of FIG. 8, regardless of the line connecting them and their supply lines, wherein a side of the rectangle lies parallel to the symmetry line S. The opposing distance between the windings on that side of the two windings 405A and 405B, which is turned away from the other winding 405B or 405A, is substantially smaller than on the other three sides, so as to bring about a concentration of the magnetic field at this point.

In accordance with another shape of the coil 405, the magnetic field in this embodiment must be conducted differently from the other embodiments, adjacent to the coil in a lateral direction, and not from the outer circumference to the center of a winding, but rather from the interior of a winding 405A or 405B to the interior of the other winding 405B or 405A. To this end, only one single plane-shaped body 407 made of the first material is needed, whose preferred direction of permeability runs parallel to the connecting line of the winding axes of the two windings 405A and 405B. This preferred direction then lies on the sides of the two windings 405A and 405B, facing one another, perpendicular to the winding sections of the two windings 405A and 405B that are found there and are covered by the body 407. In the longitudinal direction of the covered winding sections, the plate-shaped body 407 made of the first material extends to such a degree that they all run in a straight line and are parallel to one another.

In order to conduct the magnetic field to the interior of the cross-sectional areas of the two windings 405A and 405B, the plate-shaped body 407 made of the first material extends in the direction of the connecting line between the winding axes of two windings 405A and 405B up to the innermost winding on the side of each winding 405B or 405A, facing away from the other winding 405A and 405B, that is, it no longer covers the winding sections turned away from the respective other winding 405A and 405B, because this would be detrimental here to an effective flux guidance.

Adjacent on both sides of the plate-shaped body 407 made of the first material and opposite to it perpendicular to the connecting line of the two winding axes, there is a staggered arrangement of two plate-shaped bodies 411 and 412 made of the second material. Each of these two bodies 411 and 412 covers other parts of the cross-sectional areas of the two windings 405A and 405B, and they are those areas in which, because of the pattern of the windings, the magnetic field formed when the coil 405 is supplied with energy is inhomogeneous, and the first material with an anisotropic permeability would not be effective for the field guidance. In the direction of the connecting line of the two winding axes, the two plate-shaped bodies 411 and 412 made of the second material are approximately as long as the plate-shaped body 407 made of the first material.

From the preceding description, various variation possibilities of the invention can be deduced by the specialist. Thus, the coil need not be square, but rather it could be rectangular or oval; it could have the shape of a polygon with more than four sides; or it could be circular, although this would result in an expansion of the inhomogeneous field areas to the detriment of the homogeneous areas. The more inhomogeneous the field pattern, the more narrow the design of the rectangular ferromagnetic bodies with an anisotropic permeability of a uniform direction would have to be, so as to still be able to comply with the requirement of an approximately perpendicular position of the preferred direction to the permeability relative to the coil, or bodies with a preferred direction that varies in the shape of a fan in accordance with FIG. 7 would have to be used.

Although the described embodiment examples refer to the primary side of an apparatus for inductively transmitting energy, the invention is also just as suitable for the secondary side, whose coil unit can have the same structure as the coil unit of the primary side. To the extent that the discussion here is about homogeneous and inhomogeneous field areas, this is analogously true also for a secondary coil, since such a coil could also basically be supplied with energy and would then produce a magnetic field, although this is not its purpose. Moreover, the invention is independent of the spatial arrangement of the two coil units. This could also be, for example, vertical, instead of a horizontal arrangement on the bottom or on the underside of a vehicle.

The invention claimed is:

1. Apparatus for inductively transmitting electrical energy from a stationary unit to a mobile unit adjacent to the stationary unit, wherein the apparatus has a coil and a flux guide unit for guiding of a magnetic flux that appears during the operation of the apparatus with at least one ferromagnetic body having a multiplicity of individual elements, wherein the flux guide unit has the basic form of a plate and is situated on one side of the coil, perpendicular to its winding axis, in such a way that it, at least partially, covers the cross-sectional area of the coil, in that the ferromagnetic body is composed of individual elements with an anisotropic magnetic permeability, and, as a whole, has an anisotropic magnetic permeability, and in that in a viewing plane that lies perpendicular to the winding axis of the coil and in those areas in which a ferromagnetic body with an anisotropic permeability covers winding sections of the coil, the individual elements of the ferromagnetic body are aligned, relative to the coil, in such a manner that the preferred direction of the magnetic permeability in which it has the greatest magnitude in the viewing plane is, at least approximately, perpendicular to the winding sections of the coil.

2. Apparatus according to claim 1, wherein the flux guide unit has at least one ferromagnetic body with an isotropic magnetic permeability, which is situated adjacent to the body with an anisotropic permeability, in such a way that in a viewing plane that lies perpendicular to the winding axis of the coil, it covers winding sections of the coil, which no ferromagnetic body with an anisotropic permeability covers.

3. Apparatus according to claim 1, wherein the coil has an, at least approximately, symmetrical shape, and in that the flux guide unit has a multiplicity of ferromagnetic bodies with an anisotropic permeability, which are arranged symmetrically, relative to a symmetry center, and/or at least one symmetrical axis of the coil.

4. Apparatus according to claim 1, wherein all ferromagnetic bodies have, at least approximately, the shape of plates and are arranged next to one another on a plane that lies perpendicular to the winding axis of the coil.

5. Apparatus according to claim 1, wherein the elements that a ferromagnetic body with an anisotropic permeability are individual strips of an anisotropic ferromagnetic material, whose longitudinal direction is the preferred direction of the permeability, and which are situated next to one another and are joined with one another to form a closed body.

6. Apparatus according to claim 5, wherein the bonding of the individual strips of the anisotropic ferromagnetic material is brought about by a layer of an electrically nonconducting material, with the layer located between two strips adjacent to one another and the material includes, at least in part, of a nonmagnetic adhesive.

7. Apparatus according to claim 5, wherein at least one ferromagnetic body with an anisotropic permeability, the individual strips of the anisotropic ferromagnetic material are arranged in the shape of a fan.

8. Apparatus according to claim 7, wherein the fan shape is brought about by a layer, which is located between two strips of the anisotropic ferromagnetic material adjacent to one another; the layer is composed of a nonmagnetic and electrically nonconducting material, which includes, at least in part, of an adhesive; the thickness of the material increases continuously from one end of the adjacent strips to the other end.

9. Apparatus according to claim 1, wherein the windings of the coil are situated in a planar manner and run in the shape of a spiral.

10. Apparatus according to claim 1, wherein the coil has sections in which their windings run in a straight line and parallel to one another, and in that in at least one such section, at least one body with an anisotropic magnetic permeability is located, wherein the preferred direction of the magnetic permeability lies perpendicular to the windings.

11. Apparatus according to claim 1, wherein the ferromagnetic elements from which a body with an anisotropic magnetic permeability is composed are made of a nanocrystalline, soft-magnetic material.

12. Apparatus according to claim 1, wherein the elements with an isotropic magnetic permeability are made of soft-magnetic ferrite.

13. Apparatus according to claim 1, wherein the coil includes two similar windings connected to one another in series with winding axes parallel to one another and opposite winding directions, which are situated adjacent to one another in a viewing plane that lies perpendicular to the winding axes, in that the two windings have straight-line winding sections parallel to one another, at least in those areas in which they face one another, and in that a single ferromagnetic body with an anisotropic permeability covers these winding sections of both windings and at least a part of the areas of their individual cross-sectional areas surrounded by the windings.

14. Apparatus according to claim 13, wherein adjacent on both sides, relative to the ferromagnetic body with an anisotropic permeability and opposite this, perpendicular to the connecting line of the two winding axes, there is a staggered arrangement of two bodies with an isotropic permeability, each of which covers other parts of the cross-sectional areas of both windings.

15. Apparatus according to claim 1, wherein the coil is either a primary coil connected to a current supply or a secondary coil connected to a charging electronic unit of an energy storage device of a mobile unit.

\* \* \* \* \*